Aug. 26, 1958     E. W. BRUGMANN     2,849,387
CORROSION RESISTANT JACKETED METAL BODY
Filed May 1, 1945
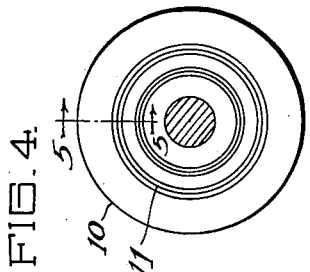
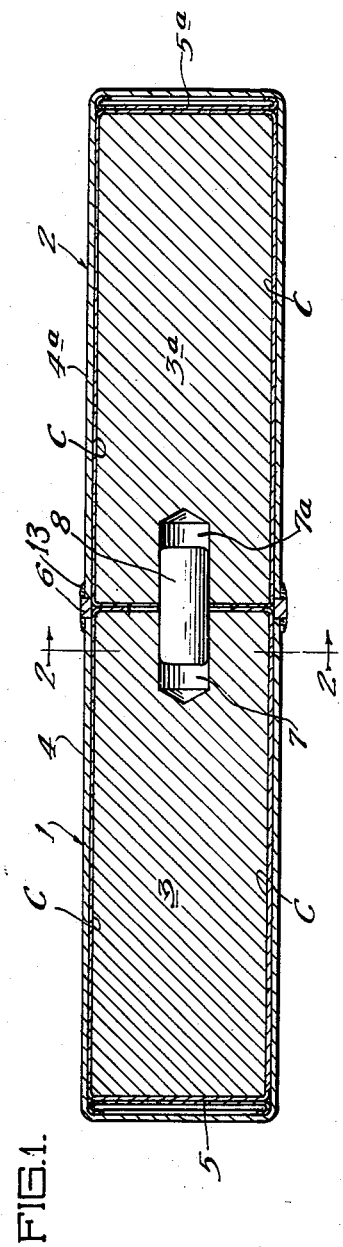
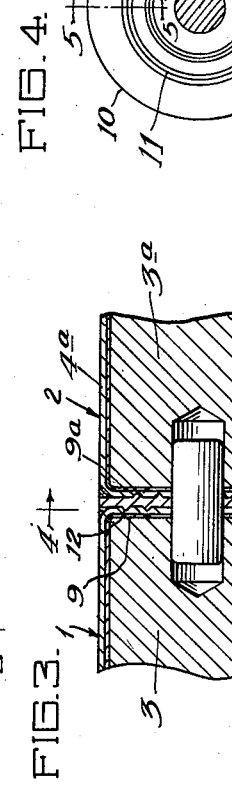
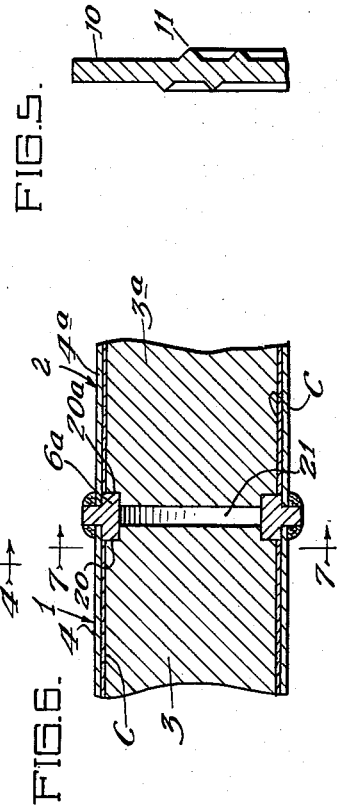
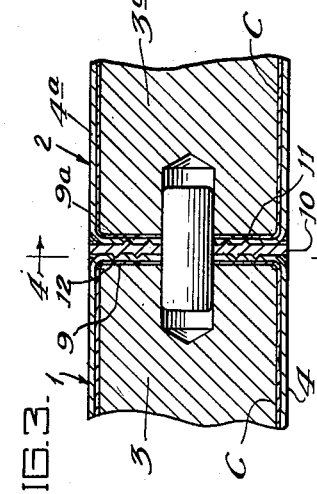
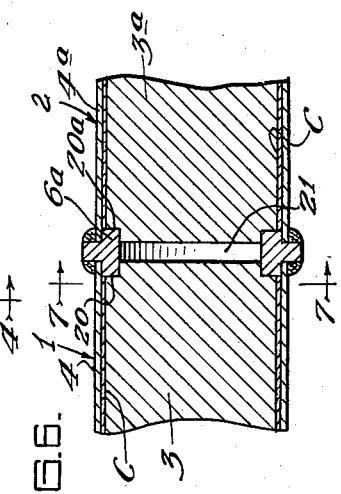
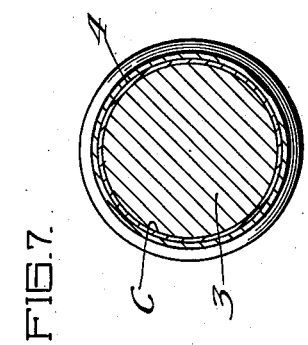
Witnesses:
Inventor:
Elmer W. Brugmann
By
Attorney United States Patent Office 2,849,387
Patented Aug. 26, 1958

2,849,387

CORROSION RESISTANT JACKETED METAL BODY

Elmer W. Brugmann, Chicago, Ill., assignor to the United States of America as represented by the United States Atomic Energy Commission Application May 1, 1945, Serial No. 591,302

15 Claims. (Cl. 204—193.2)

This invention relates to new and useful improvements in metal jacketed metallic bodies, and more particularly to metallic bodies of an easily corrodible or reactive nature that are encased within relatively inert or corrosion resistant metal jackets and thereby effectively sealed from contact with external reactive gases and liquids.

In various uses of corrodible metal bodies such as rods, cylinders or other shapes, it is desirable that the bodies be provided with jackets or coverings of relatively inert or corrosion resistant metals over their exposed surface to prevent oxidation of the metal bodies upon exposure to gases or liquids that are reactive therewith. For example, uranium or other fissionable bodies are located in a tubular conduit or passage in which they are subjected to bombardment by neutrons for the purpose of producing various products including radioactive uranium fission products, uranium isotopes and other products. The conduits or passages through which the bodies pass generally are only slightly larger in diameter than the bodies and, in order to maintain the surface temperature of the bodies within a desired range during neutronic bombardment thereof, there is passed through the conduit or passage and over the bodies a stream of a suitable coolant such as air or water. Both air and water are highly reactive with respect to uranium, particularly at elevated temperatures, and hence it is desirable that a suitable jacket or covering of a relatively inert or corrosion resistant and non-fissioning material be provided upon the uranium body to prevent corrosion thereof.

The provision of protective jackets or coverings upon such corrodible metal bodies presents certain problems of a substantially more complex and difficult nature than merely the protection of the body from contact with such reactive coolant fluids. Thus, for example, in the typical use herein described wherein uranium bodies are subjected to neutron bombardment during passage through a tubular conduit or passage of restricted area, any inleakage of the coolant fluid through the jacket or covering into contact with the uranium body will react therewith to generate gases between the body and the enclosing jacket under sufficient pressure to expand and distort the jacket outwardly thereby increasing the diameter of the jacketed body to an extent that it becomes wedged or jammed within the conduit or passage and cannot be removed therefrom. When a uranium body that is undergoing neutron bombardment becomes wedged or jammed in this manner, passage of coolant is obstructed, and an extremely dangerous condition is presented. Accordingly it is absolutely necessary that the possibility of its occurrence be minimized.

It is essential, therefore, that the jacket or covering upon the body be as secure as possible against the inleakage of coolants or other fluids that are reactive in respect thereto. Furthermore, the problem must be considered from the point of view that some inleakage of the fluid coolant may occur; hence, it is desirable to provide for the dissipation of the generated gases from the jacketed body in a manner that will prevent swelling or lateral expansion and ultimate jamming of the jacketed body within the conduit or passage.

With the foregoing in mind, an object of the invention is to provide a novel jacketed fissionable body comprising a plurality of open ended jacketed body sections secured endwise together in a manner to provide an effective leakproof seal therebetween.

Another object of the invention is to provide a novel metal jacketed metallic body of the stated character wherein the construction and arrangmeent of the jacket portions is such that, in the event of failure of the connection or joint between the sections, gases generated therein may be dissipated endwise of the jacketed body sections to thereby prevent lateral expansion of swelling of the walls of the jacket sections and possible jamming of the jacketed body sections within the conduit or passage.

These and other objects of the invention, and the various features and details of the construction and arrangement thereof are hereinafter set forth and described with reference to the accompanying drawings, in which:

Fig. 1 is a sectional view taken along the longitudinal axis of a metal jacketed uranium body embodying the present invention;

Fig. 2 is a sectional view taken on line 2—2, Fig. 1;

Fig. 3 is a fragmentary sectional view similar to Fig. 1 showing a modified construction of the jacketed metallic body;

Fig. 4 is an elevational view taken on line 4—4, Fig. 3;

Fig. 5 is an enlarged fragmentary sectional view taken on line 5—5, Fig. 4;

Fig. 6 is a fragmentary sectional view similar to Fig. 3 showing another modified construction of the jacketed body; and Fig. 7 is a sectional view taken on line 7—7, Fig. 6.

Referring now to the accompanying drawings, and particularly to Figs. 1 and 2 thereof, there is shown one embodiment of a metal jacketed fissionable body, made according to the present invention, and comprising generally a plurality of jacketed body sections 1 and 2, secured together in endwise abutting relation. Each of the jacketed body sections 1 and 2 comprises an elongated corrodible metal cylinder 3 and 3a, respectively, that is substantially encased within a jacket or container 4 and 4a, respectively, of relatively corrosion resistant metal such as aluminum, stainless steel, or the like.

In the illustrated embodiments of the invention, the jackets or containers 4 and 4a are of generally cup-shaped configuration open at one end and having an internal diameter such as to snugly receive the uranium body sections 3 and 3a, respectively. In order to provide for the efficient conduction of heat outwardly from the body sections to the jackets or containers and thereby insure effective cooling of the jacketed bodies by means of a coolant passing thereover, the jackets 4 and 4a may be securely bonded to their respective body sections 3 and 3a by means of a suitable bonding material applied, for example, to the surface of the body sections 3 and 3a in the form of a coating C by dipping the sections in a molten bath of the selected bonding material. Any suitable metal alloys having good thermal conduction properties and melting points below that of the jacket 4 and 4a such as, for example, aluminum-silicon and zinc-aluminum alloys, may be employed for this purpose.

The body sections 3 and 3a may be coated with the selected bonding material, and then inserted endwise into their jackets or containers 4 and 4a, respectively, whereupon the coating solidifies and creates an effective thermally conductive bond between the uranium body sections and the jackets or containers positioned thereon. Preferably, there is interposed between the closed ends of the jackets 4 and 4a, and the adjacent end faces of the coated body sections 3 and 3a, an insulating element 5 and 5a, respectively, that is constructed and arranged so that the central portion of the disk element is spaced from the end faces of the jacket ends to provide therebetween a substantially sealed or closed air gap that functions as a thermal insulator to minimize the conduction of heat endwise from the body containers. The disk elements 5 and 5a may be composed of the same metal as the jackets or containers.

As previously stated, the present invention is directed particularly to the provision of an efficient fluid-tight seal between the adjacent jacketed sections and as well to the provision of means for effectively securing together the adjacent sections of the body. To this end, therefore, and in accordance with the embodiment of the invention shown in Figs. 1 and 2 of the drawings, the metal jackets or containers 4 and 4a have a depth or axial length slightly less than the axial length of their respective coated metallic body sections 3 and 3a so that when the coated body sections are disposed in the endwise abutting relation illustrated, there is provided between the adjacent free end edges of the jackets 4 and 4a, a gap or space in which is disposed a continuous annular metal ring or washer element 6. The ring or washer 6 is thus disposed between the adjacent free end edges of the jackets 4 and 4a and embraces the projecting portion of the coated metal body sections 3 and 3a overlying the joint therebetween as shown.

With the jacketed body sections 1 and 2 and the ring or washer 6 positioned as shown and described, the assembly may be rigidly and permanently secured together by means of a welded connection comprising one continuous fillet 13 of weld metal between the adjacent exterior surfaces of the jacket sections 4 and 4a, respectively. For the purpose of maintaining the jacketed body sections 1 and 2 in axial alignment with one another during welding of the washer or ring 6 to the jacket sections to secure the assembly together, the adjacent end faces of the coated uranium body sections 3 and 3a may be each provided with an axial bore or socket 7 and 7a, respectively, that receives the opposite end portions of a cylindrical aligning pin or the like 8.

A rigid connection of the jacketed body sections and an effective fluid-tight seal therebetween are thus provided that afford complete protection of the uranium body sections 3 and 3a from contact with external reactive or other fluids. The present invention also embodies features of construction that afford certain advantages and safety factors in the event of the failure of the connection or joint uniting the jacketed body sections 1 and 2. Thus, for example, should the connection between the sections for any reason fail, the coolant seeps in between the adjacent ends of the body sections 3 and 3a, the corrosion products that are generated exert an endwise pressure which causes endwise separation of the body sections, rather than a circumferential separation which might otherwise occur.

Referring now to Figs. 3, 4 and 5 of the drawing, there is illustrated another embodiment of the invention that comprises generally the same jacketed body section construction previously described herein, and the same reference numerals are employed in Figs. 1 and 3 to designate like structural features and parts. In the particular embodiment of the invention shown in Fig. 3, the axial length or depth of the jacket sections 4 and 4a is somewhat greater than the axial length of the body sections 3 and 3a in order to provide a projecting jacket edge portion 9 or 9a as the case may be at the free or open end thereof that may be turned or spun inwardly over the exposed end face of its body section so that they reside in common planes normal to the longitudinal axis of the body sections in relatively confronting relation as shown. The inturned jacket edges only partially overlie their body section end faces so as to provide an opening of reduced diameter centrally through the jacket end face that does not obstruct the bores or sockets 7 and 7a provided respectively, in the body sections 3 and 3a to receive the aligning pin 8, as aforesaid.

Interposed between the plane inturned jacket edge portions 9 and 9a of the respective sections is an annular disk or washer-like element 10 and to increase the effectiveness of the seal connection between the surfaces of the washer element 10 and the jacket edge portions, the said washer 10 may be provided with one or more spaced concentric continuous ribs or the like 11 constructed and arranged to engage and interfit within correspondingly formed recesses or grooves 12 cut or otherwise formed in the inturned jacket edge portions 9 and 9a, respectively.

The jacketed body sections 1 and 2 are placed tightly together with the washer 10 interposed between the jacket edge portions 9 and 9a to interengage the ribs 11 and grooves 12 and form an essentially air tight seal so that no substantial amount of air can escape from the interior between the end surfaces of the bodies 3, 3a. By this means "blows" in the weld due to expanded air within the assembly are avoided. The sections 1 and 2 may be welded together by means of one continuous weld 13 deposited between opposite faces of the adjacent exterior surfaces of the jacket sections 4 and 4a, respectively. It will be noted that the outer diameter of the washer 10 (or ring 6) is greater than that of the jacket sections so that during welding the welding arc is guided to the edge of the washer and damage to the jacket is avoided. An effective leak-proof seal is thus provided between the jacketed body sections 1 and 2, and the construction is such that in the event of failure of the seal between the jacketed sections, the reaction products that are generated as the result of exposure of the body sections 3 and 3a to the coolant accumulate between these sections and exert an endwise pressure causing the structure to yield in a longitudinal direction without such swelling of the jacket sections that might result in the sections becoming jammed or wedged in the surrounding conduit or passage in which disposed.

If desired washer 10 may be constructed of a material such as an aluminum-silicon alloy (for example 88 percent by weight of aluminum and 12 percent by weight silicon) having a lower melting point than that of the can or jacket which may be 2–S aluminum. In such a case the joint may be established by brazing preferably by flame brazing with a flux. The washer 10 in such a case serves the dual purpose of furnishing metal for the brazing operation and also of preventing entry of flux between the bodies 3, 3a. Entry of the flux between the bodies is undesirable since the impurities such as boron so introduced absorb neutrons to an objectionable degree when the body is used in a neutronic reactor.

It will be obvious, of course, that in either embodiments of the invention herein illustrated and described, the sockets 7 and 7a and the aligning pin 8 may be eliminated, in which event the adjacent body sections may be maintained in abutting axial alignment during welding by means, for example, of a jig or other suitable support.

In accordance with a further modification the bodies 3, 3a may be joined as shown in Figs. 6 and 7. In such a case an annular ring 6a having a T cross section is mounted in annular recesses 20, 20a cut in the bodies 3, 3a respectively and is dimensioned so that a fluid tight seal is established between the sides of the annular rings and the recesses in bodies 3, 3a when endwise pressure is applied during welding. A gas space 21 is provided between the bodies 3, 3a.

In construction of this jacketed body the elements are assembled and endwise pressure applied to establish a fluid tight seal between the bodies 3, 3a and thereby to prevent escape of gas from gas space 21 during welding. The establishment of such a seal is desirable since otherwise the heat of the welding arc expands the gas in gas space 21 and in escaping to the atmosphere this gas tends to cause blows, bubbles or other defects in the weld.

After welding is completed the endwise pressure may be released and the joints between the ring 6a and the bodies cease to be fluid tight. Defective welds may then be detected by methods which depend upon passage of gas into or out of the gas space 21 through leaks in the weld.

The modification of Figs. 6 and 7 is particularly advantageous since the ring 6a maintains the assemblage in alignment during welding.

When jacketed body sections of the type herein contemplated undergo fission in a neutronic reactor heat is evolved. Since this heat is removed at the circumference of the body the temperature of the interior thereof will be substantially above the temperature of the exterior surface of the body. Consequently when inleakage of coolant between bodies 3, 3a occurs the major portion of the reaction with the coolant to form more voluminous corrosion products tends to occur at the central area which is at the highest temperature. As a result swelling caused by the corrosion products will occur in an endwise direction long before substantial circumferential swelling can occur.

From the foregoing, it will be observed that the present invention provides a novel metal jacketed uranium body construction comprising a plurality of open ended jacketed body sections that are tightly secured together in endwise abutting relation in a manner to provide an effective leakproof seal therebetween. In addition, the construction is such that, in the event of failure of the seal exposing the ends of the uranium body sections to the surrounding fluid, the generated reaction products will tend to escape from the jacketed sections and into the coolant stream. If this failure should occur after the uranium has undergone neutron bombardment fission products produced thereby also will escape from the jacketed body and the presence of these radioactive products in the coolant will permit indication of the presence of a defective jacketed body by monitoring the coolant for radiation.

While certain embodiments of the invention have been illustrated and described herein, it is not intended that the invention be limited to the disclosures, and changes and modifications may be made and incorporated as described without departure from the invention as defined by the scope of the following claims.

What is claimed is:

1. A jacketed fissionable body comprising a plurality of fissionable body sections disposed in endwise relation with respect to each other, an open-ended jacket bonded to each of said body sections, and a sealing joint connecting the open ends of said jackets to secure the jacketed body sections tightly together in said endwise relation and provide a fluid-tight seal therebetween.

2. A metal jacketed fissionable metallic body comprising a plurality of fissionable metallic body sections disposed in endwise relation with respect to each other, an open-ended metal jacket on each of said metallic body sections, a coating of a thermally conductive material intermediate the body sections and jackets securely bonding the jackets to said body sections, and means comprising a welded joint connection the open ends of said metal jackets to secure the jacketed body sections tightly together in said endwise relation and provide a fluid-tight seal therebetween.

3. A metal jacketed fissionable metallic body comprising a plurality of fissionable metallic body sections disposed in endwise relation with respect to each other, the adjacent end faces of said body sections each having a socket axially therein, a member engaging the socket in each of the body sections to maintain the same in axial alignment, an open-ended metal jacket bonded to each of said metallic body sections and means comprising a welded joint connecting the open ends of said metal jackets to secure the jacketed body sections tightly together in said endwise relation and provide a fluid-tight seal therebetween.

4. A metal jacketed fissionable metallic body comprising a plurality of fissionable metallic body sections disposed in endwise relation with respect to each other, the adjacent end faces of said body sections each having a socket axially therein, a member engaging the socket in each of the body sections to maintain the same in axial alignment, an open-ended metal jacket bonded to each of said metallic body sections, a coating of a thermally conductive material intermediate the body sections and jackets securely bonding the jackets to said body sections, and means comprising a welded joint connecting the open ends of said metal jackets to secure the jacketed body sections tightly together in said endwise relation and provide a fluid-tight seal therebetween.

5. A metal jacketed fissionable metallic body comprising a plurality of fissionable metallic body sections disposed in endwise relation with respect to each other, an open-ended metal jacket bonded to each of said body sections, an annular element interposed between the adjacent free-end edge portions of said metal jackets, and means comprising welded connections between opposite sides of said element and the adjacent metal jackets portions to secure the jacketed body sections tightly together in said endwise relation and provide a fluid-tight seal therebetween.

6. A metal jacketed fissionable metallic body comprising a plurality of fissionable metallic body sections disposed in endwise relation with respect to each other, an open-ended metal jacket on each of said body sections, an annular element interposed between the adjacent free end edge portions of said metal jackets, a coating of a thermally conductive material intermediate the body sections and jackets securely bonding the jackets to said body sections, and means comprising welded connections between opposite sides of said element and the adjacent metal jackets portions to secure the jacketed body sections tightly together in said endwise relation and provide a fluid-tight seal therebetween.

7. A metal jacketed fissionable metallic body comprising a plurality of fissionable metallic body sections disposed in endwise relation with respect to each other, the adjacent end faces of said body sections each having a socket axially therein a member engaging the socket in each of the body sections to maintain the same in axial alignment, an open-ended metal jacket bonded to each of said body sections, an annular element interposed between the adjacent free-end edge portions of said metal jackets, and means comprising welded connections between opposite sides of said element and the adjacent metal jackets portions to secure the jacketed body sections tightly together in said endwise relation and provide a fluid-tight seal therebetween.

8. A metal jacketed fissionable metallic body comprising a plurality of fissionable metallic body sections disposed in endwise relation with respect to each other, the adjacent end faces of said body sections each having a socket axially therein, a member engaging the socket in each of the body sections to maintain the same in axial alignment, an open-ended metal jacket on each of said body sections, an annular element interposed between the adjacent free-end edge portions of said metal jackets, a coating of a thermally conductive material intermediate the body sections and jackets securely bonding the jackets to said body sections, and means comprising welded connections between opposite sides of said element and the adjacent metal jacket portions to secure the jacketed body sections tightly together in said endwise relation and provide a fluid-tight seal therebetween.

9. A metal jacketed fissionable metallic body comprising a plurality of fissionable metallic body sections disposed in endwise abutting relation with respect to each other, an open-ended metal jacket bonded to each of said body sections, said metal jackets having an axial lenght slightly less than that of said body sections to provide a space between the free-end edges thereof circumferentially of the body sections at the abutting adjacent end faces thereof, an annular member embracing the adjacent end portions of the body sections and occupying the space between the free end edges of the metal jackets thereon, and continuous welded joint connections between opposite sides of said annular member and the adjacent edge portions of said metal jackets to secure the jacketed body sections tightly together in said endwise abutting relation and provide a fluid-tight seal therebetween.

10. A metal jacketed fissionable metallic body comprising a plurality of fissionable metallic body sections disposed in endwise abutting relation with respect to each other, the adjacent end faces of said body sections each having a socket axially therein, a member engaging the socket in each of the body sections to maintain the same in axial alignment, an open-ended metal jacket bonded to each of said body sections, said metal jackets having an axial length slightly less than that of said body sections to provide a space between the free end edges thereof circumferentially of the body sections at the abutting adjacent end faces thereof, an annular member embracing the adjacent end portions of the body sections and occupying the space between the free end edges of the metal jackets thereon, and continuous welded joint connections between opposite sides of said annular member and the adjacent edge portions of said metal jackets to secure the jacketed body sections tightly together in said endwise abutting relation and provide a fluid-tight seal therebetween.

11. A metal jacketed fissionable metallic body comprising a plurality of fissionable metallic body sections disposed in endwise abutting relation with respect to each other, an open-ended metal jacket on each of said body sections, said metal jackets having an axial length slightly less than that of said body sections to provide a space between the free end edges thereof circumferentially of the body sections at the abutting adjacent end faces thereof, a coating of a thermally conductive material intermediate the body sections and jackets securely bonding the jackets to said body sections, an annular member embracing the adjacent end portions of the body sections and occupying the space between the free-end edges of the metal jackets thereon, and continuous welded joint connections between opposite sides of said annular member and the adjacent edge portions of said metal jackets to secure the jacketed body sections tightly together in said endwise abutting relation and provide a fluid-tight seal therebetween.

12. A metal jacketed fissionable metallic body comprising a plurality of metal jacketed fissionable metallic body sections disposed in endwise relation and having their metal jackets partially overlying and interposed between the adjacent end faces of said body sections in relatively confronting relation, an annular member interposed between said relatively confronting jacket end portions, and means comprising continuous welded joints between opposite faces of said annular member and the external surface of the adjacent jacket section to secure the jacketed body sections tightly together in said endwise relation and provide a fluid-tight seal therebetween.

13. A metal jacketed fissionable metallic body comprising a plurality of metal jacketed fissionable metallic body sections disposed in endwise relation and having their metal jackets partially overlying and interposed between the adjacent end faces of said body sections in relatively confronting relation, the adjacent end faces of said body sections each having a socket axially therein, a member engaging the socket in each of the body sections to maintain the same in axial alignment, an annular member interposed between said relatively confronting jacket end portions, and means comprising continuous welded joints between opposite faces of said annular member and the external surface of the adjacent jacket section to secure the jacketed body sections tightly together in said endwise relation and provide a fluid-tight seal therebetween.

14. A metal jacketed fissionable metallic body comprising a plurality of metal jacketed fissionable metallic body sections disposed in endwise relation and having their metal jackets partially overlying and interposed between the adjacent end faces of said body sections in relatively confronting relation, a coating of a thermally conductive material intermediate the body section and jackets securely bonding the jackets to said body sections, an annular member interposed between said relatively confronting jacket end portions, and means comprising continuous welded joints between opposite faces of said annular member and the external surface of the adjacent jacket section to secure the jacketed body sections tightly together in said endwise relation and provide a fluid-tight seal therebetween.

15. A metal jacketed fissionable metallic body comprising a plurality of metal jacketed fissionable metallic body sections disposed in endwise relation and having their metal jackets partially overlying and interposed between the adjacent end faces of said body sections in relatively confronting relation, an annular member interposed between said relatively confronting jacket end portions, ribs on said annular member arranged for interengagement with recesses in the adjacent faces of said jacket end portions, and means comprising continuous welded joints between opposite faces of said annular member and the external surface of the adjacent jacket section to secure the jacketed body sections tightly together in said endwise relation and provide a fluid-tight seal therebetween.

References Cited in the file of this patent

UNITED STATES PATENTS

| | | |
|---|---|---|
| 719,603 | McNamee | Feb. 3, 1903 |
| 1,098,018 | Cook | May 26, 1914 |
| 1,514,652 | Burmaster | Nov. 11, 1924 |
| 1,597,189 | Gero | Aug. 24, 1926 |
| 1,788,565 | Davis | Jan. 13, 1931 |
| 1,802,716 | Howcott | Apr. 28, 1931 |
| 1,886,421 | Perkins | Nov. 8, 1932 |
| 1,981,878 | Ruben | Nov. 27, 1934 |
| 2,003,488 | Hook | June 4, 1935 |
| 2,220,773 | Moore | Nov. 5, 1940 |

FOREIGN PATENTS

| | | |
|---|---|---|
| 114,150 | Australia | Nov. 2, 1940 |
| 861,390 | France | Feb. 7, 1941 |